(12) United States Patent
Guess

(10) Patent No.: US 8,673,136 B2
(45) Date of Patent: *Mar. 18, 2014

(54) SMART FILTER

(75) Inventor: Ronald W. Guess, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/161,729

(22) Filed: Jun. 16, 2011

(65) Prior Publication Data

US 2012/0318722 A1  Dec. 20, 2012

(51) Int. Cl.
*B01D 35/143* (2006.01)
*B67D 7/32* (2010.01)

(52) U.S. Cl.
USPC .......... 210/85; 210/91; 210/100; 200/23; 200/36; 200/52

(58) Field of Classification Search
USPC .......... 210/85–87, 96.1, 97, 100, 138, 143, 210/737, 767, 91; 96/417, 424; 62/125, 62/126, 187, 389; 340/603–618; 700/273, 700/282; 222/23, 36, 52, 638
See application file for complete search history.

(56) References Cited

U.S. PATENT DOCUMENTS

| | | | |
|---|---|---|---|
| 3,656,115 A * | 4/1972 | Foerster | 340/14.31 |
| 4,646,066 A * | 2/1987 | Baughman et al. | 340/540 |
| 5,903,418 A | 5/1999 | Boivin et al. | |
| 6,058,718 A | 5/2000 | Forsberg et al. | |
| 6,182,453 B1 * | 2/2001 | Forsberg | 62/125 |
| 6,294,997 B1 * | 9/2001 | Paratore et al. | 340/572.1 |
| 6,306,290 B1 | 10/2001 | Rolfes | |
| 6,355,177 B2 | 3/2002 | Senner et al. | |
| 6,375,834 B1 | 4/2002 | Guess et al. | |
| 6,613,236 B1 | 9/2003 | Guess et al. | |
| 6,802,186 B2 | 10/2004 | Holmes et al. | |
| 6,806,808 B1 * | 10/2004 | Watters et al. | 340/10.41 |
| 7,281,386 B2 | 10/2007 | McDougal et al. | |
| 7,319,921 B2 | 1/2008 | Underwood et al. | |
| 7,399,346 B2 | 7/2008 | Van der Maas | |
| 7,782,017 B2 | 8/2010 | Hack et al. | |
| 2002/0108065 A1 * | 8/2002 | Mares | 713/300 |
| 2002/0189983 A1 | 12/2002 | Guess et al. | |
| 2004/0268194 A1 | 12/2004 | Kao et al. | |
| 2006/0017547 A1 | 1/2006 | Buckingham et al. | |
| 2006/0191824 A1 * | 8/2006 | Arett et al. | 210/85 |
| 2007/0209978 A1 | 9/2007 | Mitchell | |
| 2008/0060982 A1 | 3/2008 | Krause et al. | |
| 2012/0000858 A1 * | 1/2012 | Butler et al. | 210/741 |
| 2013/0008838 A1 * | 1/2013 | Burke et al. | 210/85 |

* cited by examiner

*Primary Examiner* — Joseph Drodge

(57) ABSTRACT

According to one embodiment, a filter may comprise a housing, a filter medium positioned within the housing, the filter medium having an operational life related to an amount of fluid passed through the filter medium, and a one-bit memory element coupled to the housing, the one-bit memory having a first state that indicates that the operational life of the filter medium has not expired and having a second state that indicates that the operational life of the filter medium has expired. The one-bit memory element may be illustratively embodied as a fusible link.

6 Claims, 5 Drawing Sheets

SMART FILTER

CROSS-REFERENCE TO RELATED U.S. PATENT APPLICATIONS

Cross-reference is made to co-pending U.S. Utility patent application Ser. No. 13/161,751 entitled "Water Dispensing System Utilizing A Smart Filter," which is assigned to the same assignee as the present application, filed concurrently herewith, and hereby incorporated by reference.

TECHNICAL FIELD

The present disclosure relates to water dispensing systems and to smart filters that may be utilized with water dispensing systems.

BACKGROUND

Many refrigerators, particularly those using a side-by-side configuration wherein a fresh food compartment is located to one side of a frozen food compartment, include integrated water and/or ice dispensing systems. Such systems typically deliver water and/or ice through a door of the frozen food compartment to a dispensing station recessed in the door. In some refrigerators, only a water dispensing system may be provided, while in other refrigerators, only an ice dispensing system may be provided. The present disclosure will refer to all such systems (whether dispensing water, ice, or both) as "water dispensing systems."

Water dispensing systems often incorporate a filtration system that utilizes a replaceable water filter to improve the quality of the water and/or ice dispensed to a user. As the water filters used in such systems each have a limited operational life, the water filter must be periodically replaced. Water dispensing systems often include various mechanisms for determining when replacement of a water filter is needed and for notifying a user of this need.

SUMMARY

According to one aspect, a water filter may comprise a housing, a filter medium positioned within the housing and configured to filter water passed through the filter medium, and a fusible link coupled to the housing, a state of the fusible link indicating whether an operational life of the filter medium has expired. In some embodiments, the state of the fusible link may be switchable between a short circuit and an open circuit. In other embodiments, the state of the fusible link may be irreversibly switchable between a short circuit and an open circuit in response to an application of a burn signal to the fusible link.

In some embodiments, the fusible link may be disposed on an exterior surface of the housing. In other embodiments, the housing may comprise an interior compartment separate from the filter medium and the fusible link may be disposed within the interior compartment. The fusible link may be electrically coupled between a first terminal and a second terminal, and the first and second terminals may be configured to electrically interface with a water dispensing system when the housing is installed in the water dispensing system. In some embodiments, the water filter may further comprise a filter detection circuit element electrically coupled in parallel with the fusible link between the first terminal and the second terminal. In still other embodiments, the water filter may further comprise a filter detection circuit element electrically coupled in series with the fusible link between a third terminal and one of the first and second terminals. The third terminal may also be configured to electrically interface with the water dispensing system when the housing is installed in the water dispensing system.

According to another aspect, a filter may comprise a housing, a filter medium positioned within the housing, the filter medium having an operational life related to an amount of fluid passed through the filter medium, and a one-bit memory element coupled to the housing, the one-bit memory having a first state that indicates that the operational life of the filter medium has not expired and having a second state that indicates that the operational life of the filter medium has expired. In some embodiments, the one-bit memory element may comprise a non-volatile memory element. In other embodiments, the one-bit memory element may comprise a fusible link. In still other embodiments, the one-bit memory element may comprise a programmable read-only memory circuit.

In some embodiments, the one-bit memory element may be reversibly switchable between the first and second states. In other embodiments, the one-bit memory element may be irreversibly switchable from the first state to the second state. The filter may further comprise a filter detection circuit element that is electronically detectable regardless of whether the one-bit memory element is in the first state or the second state.

According to yet another aspect, a filter may comprise a filter medium having an operational life related to an amount of fluid passed through the filter medium and a fusible link, wherein a state of the fusible link indicates whether the operational life of the filter medium has expired. In some embodiments, the filter may further comprise a housing, wherein the filter medium is positioned within the housing and the fusible link is coupled to the housing. In other embodiments, the state of the fusible link may be switchable between a short circuit and an open circuit. In still other embodiments, the state of the fusible link may be irreversibly switchable between a short circuit and an open circuit in response to an application of a burn signal to the fusible link. The filter may further comprise a filter detection circuit element configured to be electronically detectable when the state of the fusible link is an open circuit.

BRIEF DESCRIPTION OF THE DRAWINGS

The detailed description particularly refers to the following figures, in which.

DETAILED DESCRIPTION OF THE DRAWINGS

Figure 1:
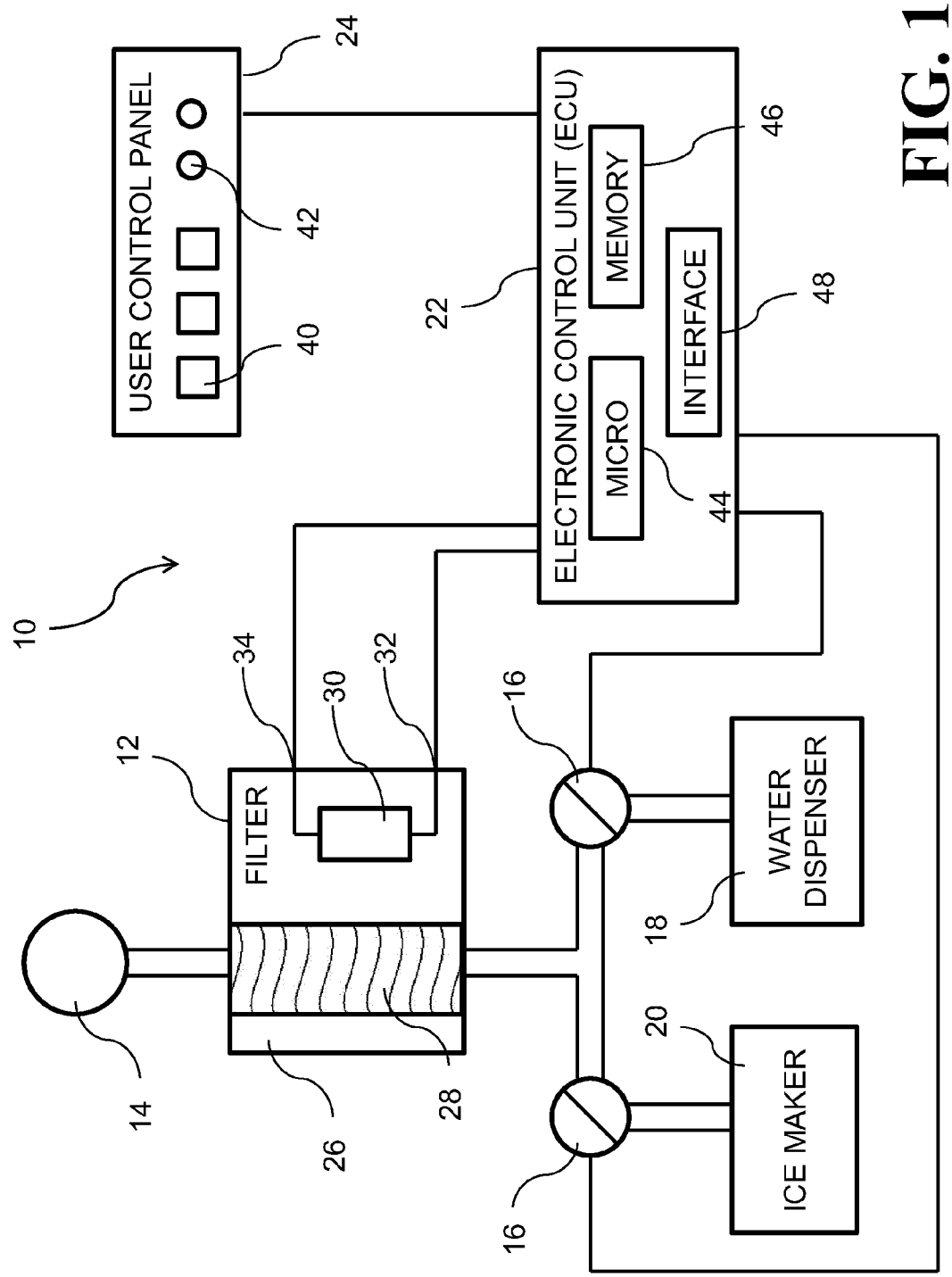
FIG. 1 is a simplified block diagram of one illustrative embodiment of a water dispensing system utilizing a smart filter.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, circuit diagrams, and types and interrelationships of system components may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Embodiments of the disclosed systems and methods may be implemented in hardware, firmware, software, or any combination thereof. Embodiments of the disclosed systems and methods implemented in a water dispensing system may include one or more point-to-point interconnects between components and/or one or more bus-based interconnects between components. Embodiments of the disclosed systems and methods may also be implemented as instructions stored on a tangible, machine-readable medium, which may be read and executed by one or more processors. A tangible, machine-readable medium may include any mechanism for storing or transmitting information in a form readable by a machine (e.g., a processor). For example, a tangible, machine-readable medium may include read only memory (ROM), random access memory (RAM), magnetic disk storage, optical storage, flash memory, and/or other types of memory devices.

The present disclosure generally relates to water dispensing systems utilizing "smart filters" that each include a one-bit memory element indicating whether an operational life of the filter has expired. As described above, many refrigerators include integrated water dispensing systems, and it is contemplated that the presently disclosed "smart filters" may be utilized with such integrated water dispensing systems. It will be appreciated, however, that the presently disclosed "smart filters" may be utilized with any number of other water dispensing systems, whether integrated into another home appliance or operating as a stand-alone system. It is also contemplated that the presently disclosed "smart filters" may be utilized with many other types of filtration systems employing replaceable filters having a limited operational life (e.g., air filtration systems employing replaceable air filters).

Referring now to FIG. 1, some of the components of a water dispensing system 10, according to one illustrative embodiment, are shown in a simplified block diagram. The water dispensing system 10 illustratively includes a "smart" replaceable water filter 12, a water inlet 14, a number of water valves 16, a water dispenser 18, an ice maker 20, a electronic control unit (ECU) 22, and a user control panel 24. In some embodiments, the water dispensing system 10 may include additional, fewer, or different components than those shown in FIG. 1 and described herein. The various components of the water dispensing system 10 may be integrated into a refrigerator, as described, for example, in U.S. Pat. Nos. 6,355,177; 6,375,834; and 6,613,236, and in U.S. Publication No. 2007/0209978, the entire disclosures of which are each hereby incorporated by reference.

According to the present disclosure, the filter 12 includes a housing 26, a filter medium 28, and a one-bit memory element 30. The filter 12 may be embodied as any type of filtering device and is illustratively embodied in the present disclosure as an activated carbon filter for purifying water. The housing 26 may take any number of shapes and may be formed of any suitable material. For instance, in some embodiments, the housing 26 may be a cartridge formed of molded plastic. The housing 26 may include one or more inlets/outlets to allow fluid to pass through the filter medium 28. The housing may also include one or more terminals to provide electrical connections for the one-bit memory element 30, as will be further described below.

The filter medium 28 of the filter 12 is positioned within the housing 26 and may comprise any suitable material for filtering impurities from a fluid passing through the filter medium 28. For instance, the filter medium 28 may include activated carbon, among other filtering media. The filter medium 28 has an operational life related to the amount of fluid that passes through the filter medium 28. The operational life of the filter medium 28 may also be related to the age of the filter. In other words, as the filter medium 28 is utilized, it generally loses some effectiveness, until the filter medium 28 reaches a point when it is no longer sufficiently effective at filtering. At this point, the operational life of the filter medium 28 has expired.

The filter 12 also includes a one-bit memory element 30 that is coupled to the housing 26. The state of the one-bit memory element 30 indicates whether the operational life of the filter medium 28 has expired. In other words, the one-bit memory element 30 has a first state that indicates that the operational life of the filter medium 28 has not expired and a second state that indicates that the operational life of the filter medium 28 has expired. The one-bit memory element 30 thus allows the filter 12 to retain information regarding its operational life even when removed from the water dispensing system 10. The one-bit memory element 30 also allows the water dispensing system 10 to recognize when an expired filter 12 is installed (rather than assuming that all newly installed filters 12 are, in fact, "new").

The one-bit memory element 30 may be embodied as any type of analog or digital circuit or circuit element capable of retaining a single bit of information (i.e., whether the operational life of the filter medium 28 has expired). In the illustrative embodiments described herein, the one-bit memory element 30 may be embodied as a fusible link 30 (described in more detail below with reference to FIGS. 2A-C). It is contemplated that other embodiments may employ other types of circuits or circuit elements as the one-bit memory element 30, including, but not limited to, a capacitor, a single memory cell (e.g., DRAM, SRAM, PROM, EPROM, or EEPROM), or a magnetic device. In some embodiments, the one-bit memory element 30 may be a non-volatile memory element. In other embodiments, the one-bit bit memory element 30 may be a volatile memory element, and the filter 12 may also include a battery for powering the one-bit memory element 30.

In some embodiments, the one-bit memory element 30 may be disposed on an exterior surface of the housing 26. In other embodiments, the housing 26 may include an interior compartment that is separate from the portion of the housing 26 where the filter medium 26 is disposed. In such embodiments, the one-bit memory element 30 may be disposed within the interior compartment of the housing 26 to shield the circuit from any fluids or temperatures present at the exterior of the housing 26, which might damage the one-bit memory element 30 or otherwise cause a malfunction. The one-bit memory element 30 is electrically coupled between a first terminal 32 and a second terminal 34 of the filter 12. The first and second terminals 32, 34 electrically interface with the water dispensing system 10 when the filter 12 is installed in the water dispensing system 10. For instance, the housing 26 may be designed to interface with a manifold, or other mating system, such that the first and second terminals 32, 34 are electrically coupled to the ECU 22 when the filter 12 is installed.

Once installed in the water dispensing system 10, the filter 12 is in fluid communication with the water inlet 14 and the water valves 16, as shown in FIG. 1. The water inlet 14 directs water received from an external water source (e.g., a house water supply) into the filter 12. The water from the water inlet 14 passes through the filter medium 28 before reaching the water valves 16. The water valves 16 may each be selectively opened or closed to control the flow of filtered water into the water dispenser 18 and/or the ice maker 20. In some embodiments, the water valves 16 may be electromechanical valves, such as solenoid-controlled valves, which open and close in response to a control signal. Filtered water delivered to the water dispenser 18 may be dispensed to a user, while filtered water delivered to the ice maker 20 may be used to form ice cubes.

The user control panel 24 may be positioned near the water dispenser 18 and/or the ice maker 20. The user control panel 24 includes a number of controls 40, such as buttons and knobs. A user may manipulate the controls 40 to manage operations of the water dispensing system 10, including instructing the water dispenser 18 to provide filtered water, turning on/off the ice maker 20, etcetera. The user control panel 24 also includes a number of indicators 42 configured to provide feedback to the user. The indicators 42 may be embodied as light-emitting diodes that are activated to alert the user to a condition of the water dispensing system 10 (e.g., "expired water filter" or "no water filter detected"). It will be appreciated that other types of displays may be used to provide feedback to the user. Furthermore, it is also contemplated that the user control panel 24 may include a speaker for delivering audible alerts to the user.

The water dispensing system 10 also includes an electronic control unit ("ECU") 22. The ECU 22 may be a dedicated controller for the water dispensing system 10 or, where the water dispensing system 10 is integrated into a refrigerator, the functions of the ECU 22 may be performed by a main controller of the refrigerator. The ECU 22 is, in essence, the master computer responsible for interpreting electrical signals sent by sensors associated with the water dispensing system 10 and for activating or energizing electronically-controlled components associated with the water dispensing system 10. For example, the ECU 22 is configured to control operation of the water valves 16, the water dispenser 18, and the ice maker 20, to monitor various signals from and apply various signals to the user control panel 24 and the filter 12, and to determine when various operations of the water dispensing system 10 should be performed, amongst many other things. In particular, as will be described in more detail below with reference to FIG. 3, the ECU 22 is operable to determine the state of the one-bit memory element 30 of the filter 12 and to switch the state of the one-bit memory element 30, as necessary.

To do so, the ECU 22 includes a number of electronic components commonly associated with electronic units utilized in the control of electromechanical systems. For example, the ECU 22 may include, amongst other components customarily included in such devices, a processor such as a microprocessor 44 and a memory device 46 such as a programmable read-only memory device ("PROM") including erasable PROM's ("EPROM" or "EEPROM"). The memory device 46 is provided to store, amongst other things, instructions in the form of, for example, a software routine (or routines) which, when executed by the microprocessor 44, allows the ECU 22 to control operation of the water dispensing system 10.

The ECU 22 also includes an analog interface circuit 48. The analog interface circuit 48 converts output signals (e.g., from the filter 12) into signals which are suitable for presentation to an input of the microprocessor 44. In particular, the analog interface circuit 48, by use of an analog-to-digital (A/D) converter (not shown) or the like, converts analog signals into digital signals for use by the microprocessor 44. It should be appreciated that the A/D converter may be embodied as a discrete device or number of devices, or may be integrated into the microprocessor 44. It should also be appreciated that if any one or more of the sensors associated with the water dispensing system 10 generate a digital output signal, the analog interface circuit 48 may be bypassed.

Similarly, the analog interface circuit 48 converts signals from the microprocessor 44 into output signals which are suitable for presentation to the electrically-controlled components associated with the water dispensing system 10 (e.g., the water valves 16). In particular, the analog interface circuit 48, by use of a digital-to-analog (D/A) converter (not shown) or the like, converts the digital signals generated by the microprocessor 44 into analog signals for use by the electronically-controlled components associated with the water dispensing system 10. It should be appreciated that, similar to the A/D converter described above, the D/A converter may be embodied as a discrete device or number of devices, or may be integrated into the microprocessor 44. It should also be appreciated that if any one or more of the electronically-controlled components associated with the water dispensing system 10 operate on a digital input signal, the analog interface circuit 48 may be bypassed.

Thus, the ECU 22 may control and/or monitor operation of the filter 12, the water valves 16, the water dispenser 18, the ice maker 20, and the user control panel 24. In particular, the ECU 22 executes a routine including, amongst other things, a control scheme in which the ECU 22 monitors outputs of the sensors associated with the water dispensing system 10 to control the inputs to the electronically-controlled components associated therewith. To do so, the ECU 22 communicates with the sensors associated with the water dispensing system 10 to determine, amongst numerous other things, the state of the one-bit memory element 30 of the filter 12 and/or of the water valves 16. Armed with this data, the ECU 22 performs numerous calculations, either continuously or intermittently, including looking up values in preprogrammed tables, in order to execute algorithms to perform such functions as controlling the water valves 16, determining when usage of the filter 12 reaches a threshold value, switching the state of the one-bit memory element 30, etcetera.

Figure 2A:
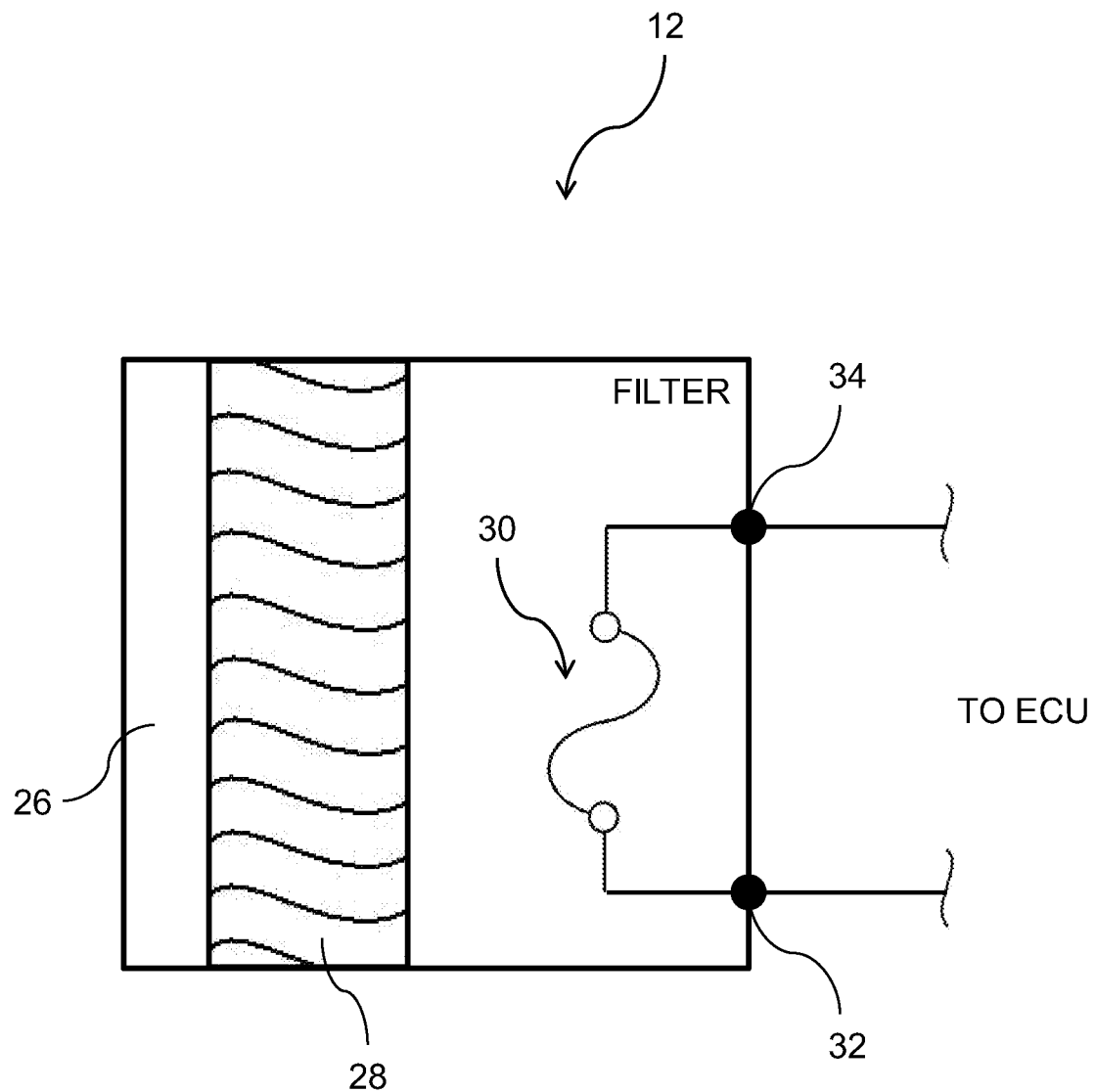
FIG. 2A is a simplified block diagram of one illustrative embodiment of a smart filter that may be utilized with the water dispensing system of FIG. 1.
Figure 2B:
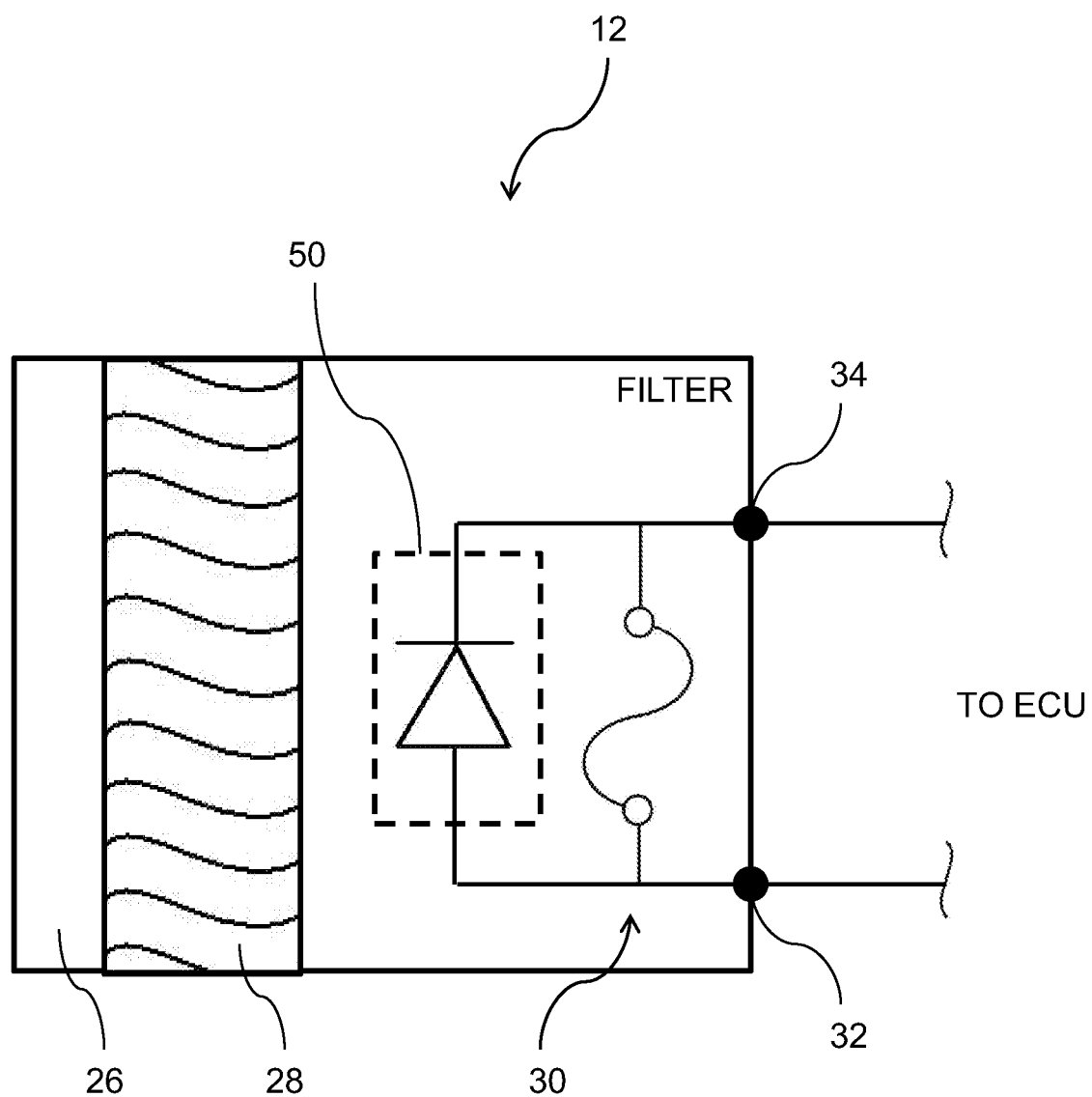
FIG. 2B is a simplified block diagram of another illustrative embodiment of a smart filter that may be utilized with the water dispensing system of FIG. 1.
Figure 2C:
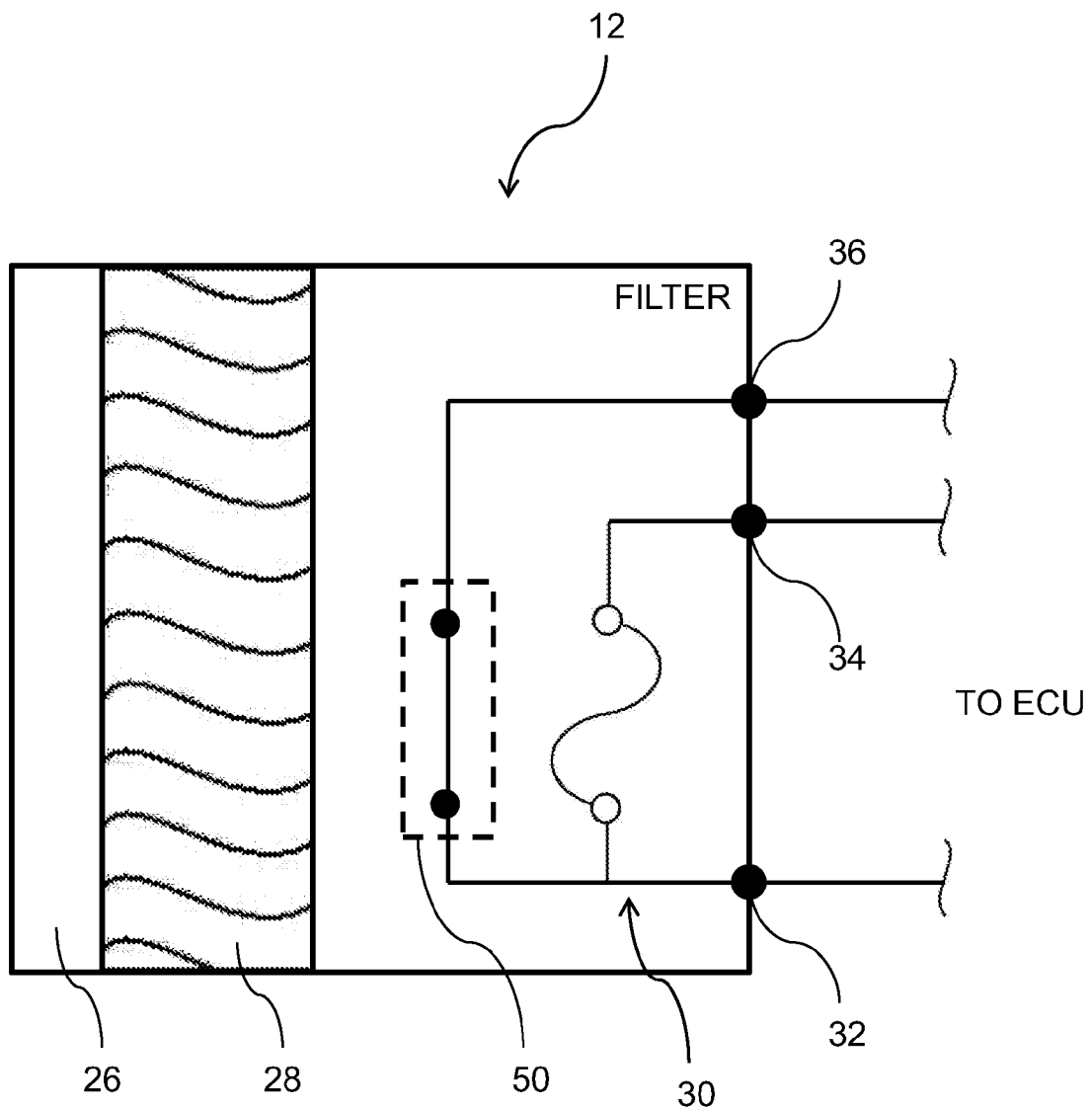
FIG. 2C is a simplified block diagram of another illustrative embodiment of a smart filter that may be utilized with the water dispensing system of FIG. 1.

Referring generally to FIGS. 2A-C, several illustrative embodiments of the filter 12 are shown. Each of these embodiments of the filter 12 includes a housing 26, a filter medium 28, a one-bit memory element 30, and first and second terminals 32, 34. These components are labeled using the same reference numerals as FIG. 1, and similar components are labeled using similar reference numerals in all figures throughout this disclosure.

As shown in FIG. 2A (as well as in FIGS. 2B and 2C), the one-bit memory element 30 is illustratively embodied as a fusible link 30. The fusible link 30 is switchable between two states: a short circuit and an open circuit. The fusible link 30 may comprise a standard fuse, which operates as a short circuit until a sufficient current is applied to "burn" the fuse to an open circuit. Alternatively, the fusible link 30 may comprise an anti-fuse, which operates as an open circuit until a sufficient current is applied to "burn" the fuse to a short circuit. In either case, one state of the fusible link 30 may indicate that the operational life of the filter medium 28 has not expired, while the other state of the fusible link 30 may indicate that the operational life of the filter medium 28 has expired. For the remainder of the disclosure, the fusible link 30 will be described as a standard fuse in which an open circuit indicates that the operational life of the filter medium 28 has expired. It will be appreciated, however, that alternative configurations might be used.

As discussed above, the fusible link 30 is electrically coupled between the first and second terminals 32, 34 of the filter 12. The first and second terminals 32, 34 provide electrical connections to the ECU 22 when the filter 12 is installed in the water dispensing system 10. When connected, the ECU 22 may apply a query signal to the first and second terminals 32, 34 to determine the state of the fusible link 30. For instance, the ECU 22 may apply a relatively low voltage to the first and second terminals 32, 34 and measure any current response. If a current response is observed, the ECU 22 may determine that the state of the fusible link 30 is a short circuit (and, thus, that the filter medium 28 has not exceeded its operational life). Alternatively, if no current response is observed, the ECU 22 may determine that the state of the fusible link 30, if present, is an open circuit (and, thus, that the operational life of the filter medium 28 has expired).

The ECU 22 may also be operable to apply a burn signal to the first and second terminals 32, 34 to switch the state of the fusible link 30. For instance, the ECU 22 may apply a relatively high voltage to the first and second terminals 32, 34 that is sufficient to alter the state of the fusible link 30 to a short circuit. For many types of fusible links 30, this switch between a short circuit and an open circuit will be irreversible. In other embodiments, however, a fusible link 30 (other other one-bit memory element 30) may be used which is capable of being reversibly switched back to its original state. Such a reversion to the state indicating that the operational life of the filter medium 28 has not expired may be used where the filter medium 28 has been restored (such as by replacement or recycling of the filter medium 28).

The illustrative embodiments of the filter 12 shown in FIGS. 2B and 2C further include a filter detection circuit element 50. The filter detection circuit element 50 allows the ECU 22 to differentiate between the absence of a filter 12 at the first and second terminals 32, 34 and the presence of a filter 12 having a fusible link 30 in an open circuit state (both will appear as open circuits to the ECU 22). If the ECU 22 detects an open circuit at the first and second terminals 32, 34, the ECU 22 may then assess whether the filter detection circuit element 50 is present to determine whether a filter 12 is installed in the water dispensing system 10.

In the embodiment shown in FIG. 2B, the filter detection circuit element 50 is electrically coupled in parallel with the fusible link 30 between the first and second terminals 32, 34. In this configuration, the filter detection circuit element 50 may be embodied as a diode 50. The ECU 22 may sense the presence of the diode 50 using the same first and second terminals 32, 34 used to query the state of the fusible link 30.

In the embodiment shown in FIG. 2C, the filter detection circuit element 50 is electrically coupled in series with the fusible link 30 between a third terminal 36 of the filter 12 and one of the first and second terminals 32, 34. In this configuration, the filter detection circuit element 50 may be embodied as a shorting bar 50. As shown in FIG. 2C, the ECU 22 may sense the presence of the shorting bar 50 by applying a query signal to the first and third terminals 32, 36 and measuring the response. In the embodiment of the filter 12 shown in FIG. 2C, the filter detection circuit element 50 may alternatively be embodied as a circuit element having some measurable characteristic (e.g., a resistance) that is designed to be related to one or more characteristics of the filter medium 28 of the filter 12. In such embodiments, the ECU 22 may measure the characteristic of the filter detection circuit element 50 to determine a characteristic of the filter medium 28 installed in the water dispensing system 10 (e.g., the unique operational life of the filter medium 28).

Figure 3:
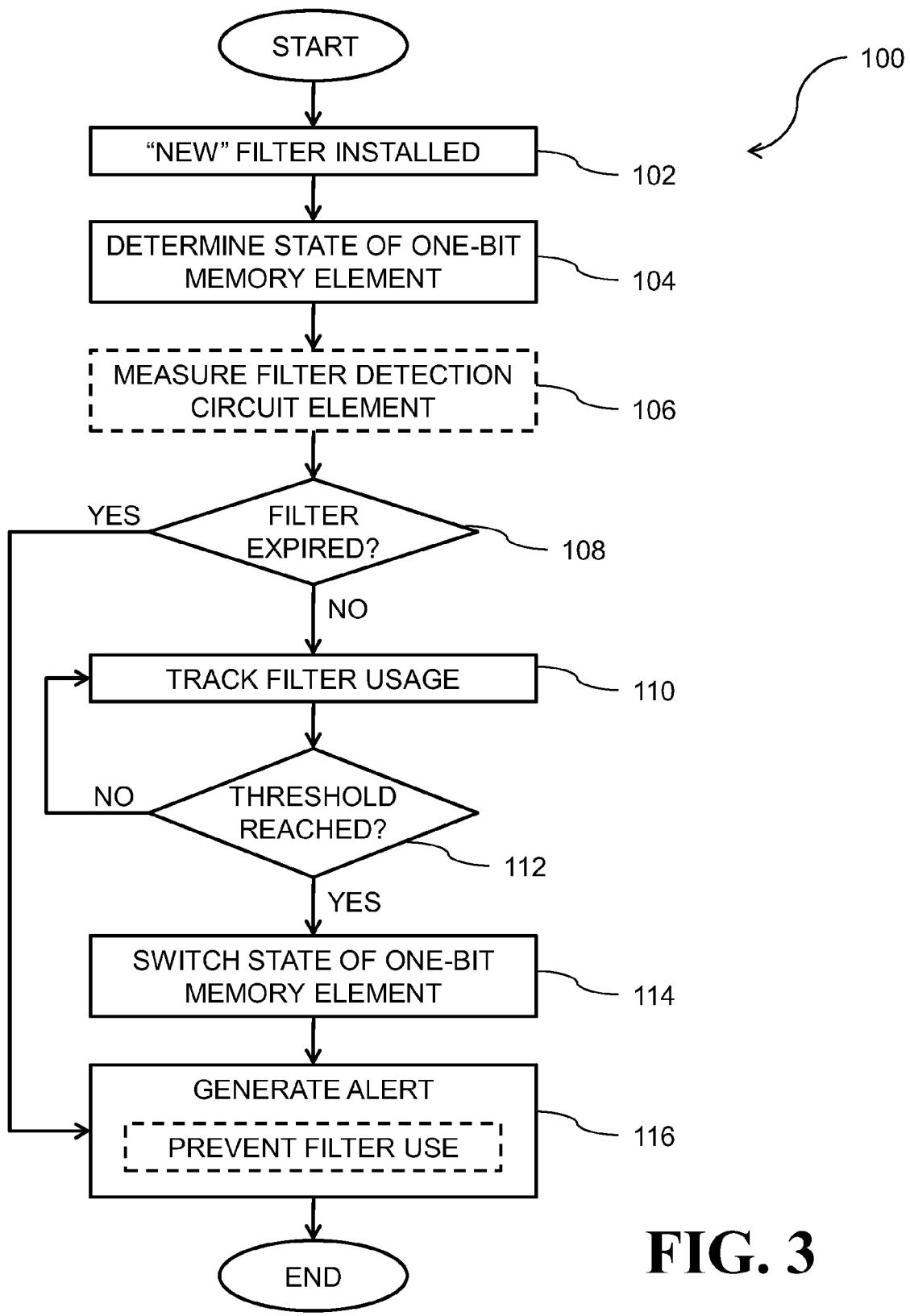
FIG. 3 is a simplified flowchart of a method of operating the water dispensing system of FIG. 1.

Referring now to FIG. 3, an illustrative embodiment of a method of operating the water dispensing system 10 of FIG. 1 is illustrated as a simplified flow diagram. The operating process 100 may be used to determine whether the filter medium 28 of a filter 12 installed in the water dispensing system 10 has exceeded its operational life and a new filter 12 is required. The operating process 100 includes a number of process steps 102-116, as shown in FIG. 3. Process step 106 and a portion of process step 116 may be optionally employed in the operating process 100 and are, therefore, indicated in phantom in FIG. 3.

The operating process 100 begins with process step 102, in which a "new" filter 12 is installed in the water dispensing system 10. The operating process 100 begins at step 102 each time a filter 12 is installed (after a period in which a filter 12 was absent from the water dispensing system 10). The newly installed filter 12 may have remaining operational life (i.e., be "new") or the user may have improperly reinstalled a used filter 12 for which the operational life of the filter medium 28 has expired. In either case, the operational life of the filter medium 28 will be indicated by the state of the one-bit memory element 30 of the filter 12.

After process step 102, the operating process 100 proceeds to process step 104, in which the ECU 22 determines the state of the one-bit memory element 30. As described above, the ECU 22 may apply a query signal to the one-bit memory element 30 to determine whether it is in a first state that indicates that the operational life of the filter medium 28 has not expired or a second state that indicates that the operational life of the filter medium 28 has expired. Where the one-bit memory element 30 is embodied as a fusible link 30, the ECU 22 may determine whether a short circuit or an open circuit exists between the first and second terminals 32, 34.

After process step 104, the operating process 100 optionally proceeds to process step 106, in which the ECU 22 assesses the presence of a filter detection circuit element 50. As noted above, the ECU 22 may need to attempt to measure the filter detection circuit element 50 to differentiate between a fusible link 30 in an open circuit state and the absence of a filter 12 (for instance, if the filter has been removed after installation in process step 102). In process step 104, the ECU 22 may also optionally measure a characteristic of the filter detection circuit element 50 to determine one or23 more characteristics of the filter medium 28 of the filter 12.

After process step 106 (or process step 104, if optional process step 106 is unneeded or not employed), the operating process 100 proceeds to process step 108. In process step 108, the ECU 22 determines whether the operational life of the filter medium 28 has expired, based on the data retrieved in process step 104 (and optionally process step 106). For instance, in an embodiment employing the filter 12 shown in FIG. 2A, if the ECU 22 detected an open circuit in process step 104, the ECU 22 may conclude that the operational life of the filter medium 28 has expired. In such a case, the operating process 100 proceeds directly to process step 116 (described in further detail below).

If the ECU 22 instead determines, during process step 108, that the operational life of the filter medium 28 has not expired, the operating process 100 proceeds to process step 110. In process step 110, the ECU 22 tracks usage of the filter 12 during the operation of the water dispensing system 10. Process step 110 may involve the ECU 22 measuring the amount of fluid passed through the filter medium 28 over time. In some embodiments, this may be accomplished via a flow sensor disposed near the filter 12. In other embodiments, the amount of fluid passed through the filter medium 28 may be measured indirectly. For instance, where the flow rate of the water valves 16 is known, the ECU 22 may instead measure the accumulated activation time of the water values 16 and calculate the amount of fluid.

As process step 110 proceeds, the operating process also periodically performs process step 112, in which the ECU 22 determines whether the usage of the filter 12 has reached a threshold value. In the illustrative embodiment, process steps 110 and 112 are used together to determine when the operational life of the current filter medium 28 has expired. A number of algorithms may be used to determine when the usage of the filter 12 has reached the threshold value. Several illustrative algorithms that may be employed in the operating process 100 are described in U.S. Pat. Nos. 6,355,177; 6,375,834; and 6,613,236. In other embodiments, the threshold value may represent some amount of usage of the filter 12 less than the entire operational life of the filter medium 28. For instance, it is contemplated that the operating process 100 may be designed to switch the state of the one-bit memory element 30 of the filter 12 immediately or soon after the filter 12 is installed in the water dispensing system 10 (i.e., the threshold value may be relatively low, or even zero). If the ECU 22 determines in process step 112 that the usage of the filter 12 has not yet reached the threshold value, the operating process returns to process steps 110 and 112 (where the ECU 22 continues to track and evaluate usage of the filter 12).

If the ECU 22 instead determines, during process step 112, that the usage of the filter 12 has reached the threshold value, the operating process 100 proceeds to process step 114. In process step 114, the ECU 22 switches the state of the one-bit memory element 30 of the filter 12. In other words, the ECU 22 switches the one-bit memory element 30 from the first state that indicates that the operational life of the filter medium has not expired to the second state that indicates that the operational life of the filter medium has expired. In embodiments where the one-bit memory element 30 is embodied as a fusible link 30 (e.g., the filters 12 illustrated in FIGS. 2A-C), the ECU 22 applies a burn signal to the fusible link 30 to switch the state of the fusible link 30 from a short circuit to an open circuit, as described above.

After process step 114, the operating process 100 proceeds to process step 116, in which the ECU 22 generates an alert informing the user that the operational life of the filter medium 28 has expired and that a replacement filter is required. The ECU 22 may generate this alert using the user control panel 24. For instance, the ECU 22 may illuminate a light-emitting diode 42 on the user control panel 24 corresponding to the status of the filter 12. Additionally or alternatively, the ECU 22 may cause an audible alert to sound from the user control panel 24. It is contemplated that other forms of alerts may also be generated (e.g., an electronic message sent directly to the user). Optionally, process step 116 may also involve the ECU 22 preventing the user from operating the water dispensing system 10 until a replacement filter is installed. For instance, the ECU 22 may override the water valves 16 to prevent water from passing through the filter medium 28 (and, thus, from being dispensed to a user) until a replacement filter is installed. Once the current filter 12 is removed (and a "new" filter 12 is installed), the operating process begins again at process step 102.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

The invention claimed is:

1. A water filter comprising:
a housing;
a filter medium positioned within the housing and configured to filter water passed through the filter medium;
a fusible link coupled to the housing, a state of the fusible link indicating whether an operational life of the filter medium has expired, wherein the fusible link is electrically coupled between a first terminal and a second terminal, the first and second terminals being configured to electrically interface with a water dispensing system when the housing is installed in the water dispensing system, and
a filter detection circuit element electrically coupled in parallel with the fusible link between the first terminal and the second terminal.

2. The water filter of claim 1, wherein the state of the fusible link is switchable between a short circuit and an open circuit.

3. The water filter of claim 1, wherein the state of the fusible link is irreversibly switchable between a short circuit and an open circuit in response to an application of a burn signal to the fusible link.

4. The water filter of claim 1, wherein the fusible link is disposed on an exterior surface of the housing.

5. The water filter of claim 1, wherein the housing comprises an interior compartment separate from the filter medium and the fusible link is disposed within the interior compartment.

6. The water filter of claim 1, further comprising a filter detection circuit element electrically coupled in series with the fusible link between a third terminal and one of the first and second terminals, the third terminal being configured to electrically interface with the water dispensing system when the housing is installed in the water dispensing system.

* * * * *